Patented Feb. 11, 1947

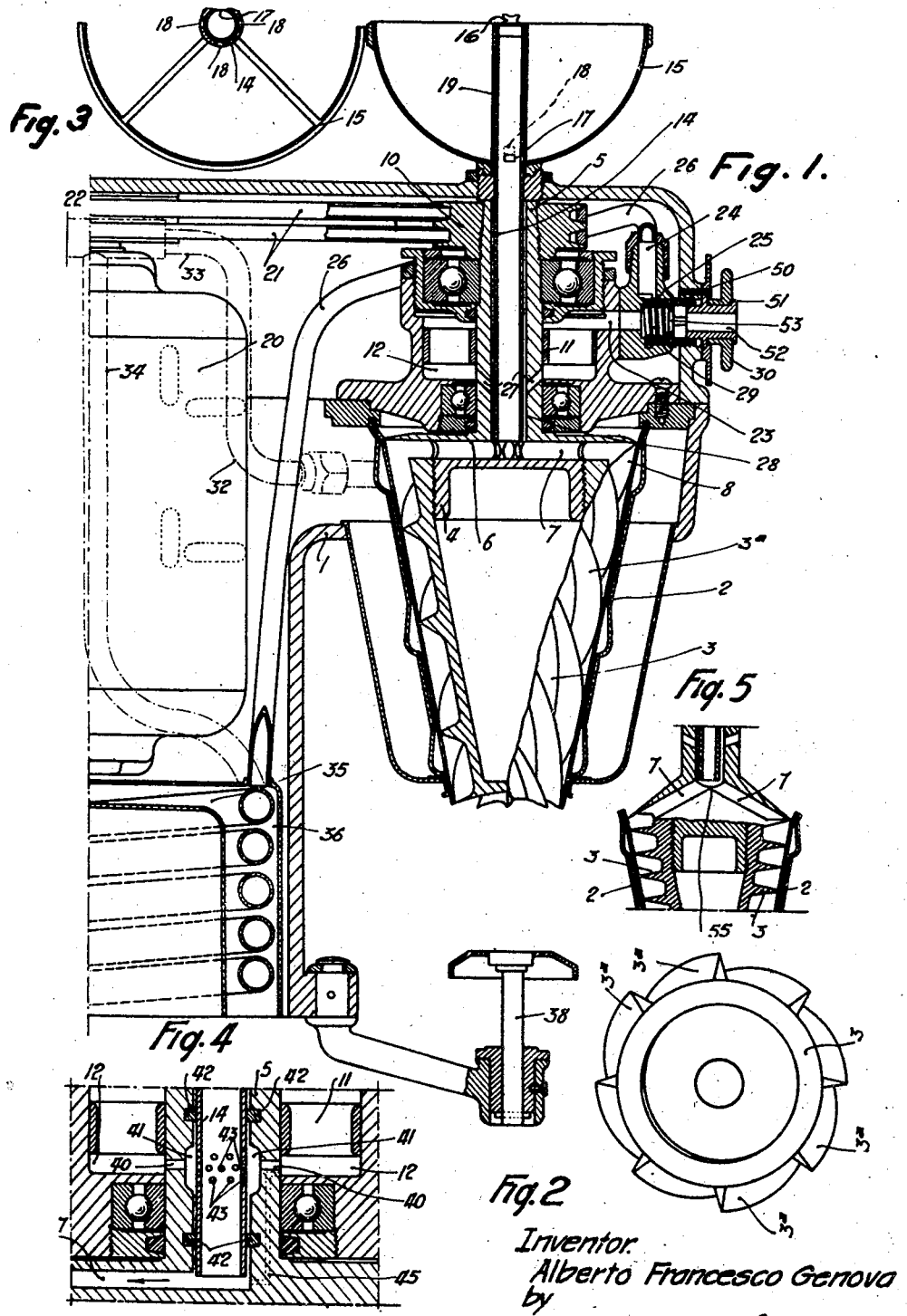

2,415,585

UNITED STATES PATENT OFFICE 2,415,585

APPARATUS FOR THE INSTANTANEOUS PREPARATION OF ICED FOODSTUFFS SUCH AS CREAMS OR THE LIKE

Alberto Francesco Genova, Treviso, Italy, assignor to Automatic Holding Company, Societe Anonyme, Luxemburg, Luxemburg, a corporation of Luxemburg Application March 28, 1939, Serial No. 264,536
In Germany March 31, 1938

4 Claims. (Cl. 62—114)

Apparatus is already known for obtaining congealed foodstuffs such as creams and in which the material to be congealed is projected by centrifugal force against a fixed cooled wall, the frozen material being scraped from the wall by a spiral scraper integral with a turning member arranged inside the refrigerating wall. In this apparatus the mass to be congealed is projected from the rotor in a single jet generally through an orifice. This apparatus has a relatively low output by reason of the projection through a hole of small section. Moreover this hole may readily become blocked and which would practically prevent the mixture in the ice cream of solid substances such as portions of fruit, almonds or the like. Moreover this apparatus requires complete dismantling to allow cleaning thereof.

The applicant is concerned with considerably increasing the yield of this apparatus while remedying the above disadvantages.

The apparatus according to the invention is of the type comprising a fixed cooled wall inside which a spiral rotor rotates for scraping off the product projected and congealed on this wall, but it is characterized in that the tubular axis of the rotor communicates at its lower part with divergent channels arranged in the latter, and with the outlet of each of which there is associated a spiral scraping projection, so that the material to be congealed introduced through this tubular axis, with or without admixture with air drawn in by the rotation of the rotor, is subdivided in each of the said channels and is projected against the refrigerating wall in several jets, the congealed material from each jet being scraped off and removed towards the base by the corresponding spiral projection of the rotor.

The material is thus divided into several streams (one per channel) each of which may have an output equal to that of the single projection orifice in the previous apparatus.

The material may be aerated before its entry into the tubular axis of the apparatus, or the divergent channels of the rotor may act by means of their walls like the vanes of a centrifugal fan, and during the rotation of the rotor, draw in air through the tubular axis of the rotor. This air then mixes with the material not yet congealed, and there is produced a partial aeration which may be completed in the channels, the materials being projected out of the rotor against the cooled wall. Moreover to ensure the rapid removal of each jet after congelation, it is necessary that to each channel there should be a corresponding spiral scraping projection.

It has likewise been proposed in former apparatus to inject air into the material during the cooling phase, but the aeration effected is imperfect and better results are obtained according to the present application by mixing, according to the teaching of this application, the air with the material before the projection and freezing of this material.

The invention likewise extends to various particular points which will become apparent from the following description reference being made to the accompanying drawing, which is given solely by way of example. In this drawing Figure 1 is a sectional elevation of an apparatus according to the invention.

Figure 2 is a plan of the spiral rotor.

Figure 3 is a plan of the partitioned distributing receptacle or bowl.

Figure 4 is a detailed view of a modification for an air feed.

Figure 5 is a diagrammatic view of a modification of the projection ducts or channels.

The apparatus shown by way of example only in Figures 1, 2 and 3 comprises, in a manner known per se, a general casing 1, a double walled casing 2 for circulation of a liquid refrigerant and a spiral rotor 3 arranged in the truncated conical space bounded by the casing 2.

The spiral rotor 3 is fixed to a central member 4 extended axially upwards by a tubular member 5. This member 4, which is arranged so as to form a plate or disc 6 for closing the upper part of the space bounded by the cold casing 2, comprises radial channels 7 terminating in the upper part 8 of the rotor and under the plate 6 opposite the cooled casing 2. Moreover the tubular part 5 also opens into the said channels as shown.

To the tubular part 5 is connected a pulley 10, and if desired a fan 11 arranged in a chamber 12.

The rotor 3 comprises several spiral projections 3a (eight in the example shown) regularly distributed, and channels 7 (eight in this example) also regularly disposed and communicating with the spaces defined by the spiral projections. The air and the product to be congealed are simultaneously projected through the different ducts against the cooled wall, and the mixture is rapidly scraped off by the spiral projections which follow the different channels.

The air is normally drawn through the tubular axis 5 by the rotation of the rotor whose channels 7 act as the vanes of a centrifugal fan, the fan 11 being not necessary. However, by using such a fan a considerable increase of the output of air injected into the material and consequently an improvement in the treatment of the material in each channel 7 is obtained. The divergent channels 7 are arranged along radiating straight lines, or spirals, and they may be arranged in stages.

A fixed tube 14 for feeding the product is arranged coaxially with the tubular part 5 and inside the latter, this tube opening at the lower part into the channels 7. Upon the end part of the tube 14 is mounted, so as to turn, a bowl 15 radially partitioned so as to constitute independent compartments in which may be stored different products. The tube 14, which may be closed at its upper part by a detachable stopper 16 to avoid the entry of dust, particularly when the apparatus is not in use, includes a radial aperture 17 which may communicate with any of the corresponding apertures 18 arranged on the central tubular wall 19 of the bowl. In this way by suitable angular displacement of the bowl 15 it is possible to bring into communication any compartment of this bowl with the tube 14 so as to ensure the feeding of this tube with the desired product. In intermediate positions the aperture 17 of the tube 14 is closed and the feeding is cut off.

The rotary assembly comprising the member 4, its tubular part 5, its plate 6, the spiral rotor 3, the pulley 10 and if desired the fan 11, is driven with a rotary movement at any suitable speed by means of an electric motor 20, the transmission of movement being effected by belts 21 passing over the multiple pulley 10 and a multiple pulley 22 fixed on the shaft of the motor.

The chamber 12 of the fan communicates on the one hand through the channels 23 and 24 controlled by a valve 25 with a channel 26 for the admission of cooled air as will be indicated subsequently, and on the other hand through channels 27 with the annular space 28 arranged between the internal wall of the tubular part 5 and the external wall of the feeding tube 14. The valve 25 which is constantly urged towards its open position by a spring 29 is adjusted in position by a handwheel 30 forming an abutment. This device is more particularly arranged to receive detachable cartridges holding suitable perfumes or essences. The valve 25 controlling the communication between the channels 23 and 24 is adjusted in position by a tubular member 50 screwed on the casing 1 and whose angular displacement is controlled by the handwheel 30. With this object in view the hub 51 of the handwheel is fixed in the angular direction but not in the translatory direction to the tubular member 50 and it is perforated axially at 52 to receive a cartridge holding a desired perfume. The valve 25 is likewise perforated axially at 53 to allow the admission of this perfume with the air.

The cold enclosure bounded by the double wall of the casing 2 is fed with refrigerating liquid by a liquid refrigerant supplying apparatus which is not shown because it does not form a feature of importance to the invention.

The vapours of the liquid refrigerant, which are still cold, after passage through the freezer, pass into a tube 32 shown by dot and dash lines. This tube 32 which may be extended at 33 comprises at least one section 34 which may be the return channel. This section 34 terminates in a worm 35 arranged in a bell or other compartment 36 into which external air is drawn after passage through a filter. This suction is produced by the fan 11. Thus, previous cooling of the air intended to aerate and to transport the product to be frozen is effected as will be indicated subsequently.

Below the lower part of the spiral rotor 3 is arranged a support 38, preferably adjustable, intended to support a cup or the like into which the congealed product enters.

The operation of the apparatus described above is as follows.

After starting the apparatus and suitable regulation of the valve 25 the bowl 15 is displaced to produce the feeding of the tube 14 with the desired product. This product runs out at the lower part of the tube 14 into the channels 7 in which it is mixed with the air drawn in by the rotor and if desired driven by the fan 11 into said channels through the channels 27 and space 28. The circulation of air under pressure is effected by the double action of the fan 11 drawing in the external air and driving it into the space 28, and by the rotor 3 which acts as a suction pump. The air is intimately mixed with the product and transports it against the cold wall of the casing 2 at the position indicated by the references numeral 8. It will be noted that the mass of the product is divided by the various channels so as to constitute independent jets of material.

Each jet is projected against the cooling wall and is frozen and then removed by the corresponding projection of the spiral rotor, which transports it to the lower part to fill a cup, for example, one previously arranged on the support 38.

The product according to its nature and according to the consistency and the appearance which it is desired to impart thereto, is more or less overrun or mixed with air; this regulation may be effected by modifying the intake of air by action upon the handwheel 30.

It will be noted that the closure stopper 16 for the upper part of the tube 14 is detachable to permit the entry into this tube not only of the air drawn in, but likewise of liquid or gaseous fluids or solid substances such as fruits, almonds or the like. Additional products in the form of perfumes may likewise be incorporated with the product by the air drawn in.

Figure 4 illustrates a modification of the system of air feed. In this case the air supplied by the fan 11 passes through the channels 40 into an annular chamber 41 arranged in the rotating tubular part 5, gas tight joints being provided at 42. The tube 14 for feeding the product is provided with inclined perforations 43 variously arranged, in stages. These perforations allow injections of jets of air through the tube 14 into the product for entraining the same and ensuring thorough aeration.

Likewise there may be provided a secondary channel 45 (indicated in dotted lines) and causing direct communication of the chamber 12 of the fan with the channel 7 so as to effect supplementary agitation of the product in the tube 14.

In this example the radial ducts 7 are arranged in the same plane perpendicular to the axis of rotation of the spiral rotor.

Figure 5 illustrates diagrammatically a modification showing another arrangement of the ducts 7. In this modification the ducts 7 are regularly distributed over a conical surface so as to facilitate the removal and distribution of the mixture of the product and the air.

Obviously the fan 11 may be dispensed with and the already aerated material may be introduced as has been stated above.

What I claim is:

1. Apparatus for the instantaneous preparation of congealed foodstuffs such as ice cream and the like, comprising a spiral rotor, a tube mounted in the axis of said rotor and perforated at its upper part, a receptacle on said tube adapted to contain the material to be congealed and which material may enter said tube through said perforations, while air drawn in by the rotor enters through the upper end of the axis, divergent channels in said rotor communicating with the tubular axis thereof, a fixed refrigerated wall located outside said rotor and upon which the jets of emulsified material are adapted to be projected and refrigerated, and a spiral projection upon said rotor at the outlet of each of the divergent channels, adapted to scrape off and remove downwardly the congealed material coming from the corresponding channel.

2. Apparatus for the instantaneous preparation of congealed foodstuffs such as ice creams or the like, comprising a spiral rotor, perforations in the tubular axis of said rotor adapted to induct air into said rotor, diverging channels in said rotor communicating with the tubular axis thereof, means for introducing material to be congealed into the upper part of said channel, a fixed refrigerated wall outside of said rotor and upon which the jets of aerated material are adapted to be projected and refrigerated, and a spiral projection upon said rotor at the outlet of each of the divergent channels and adapted to scrape off and remove downwardly the congealed material coming from the corresponding channel.

3. Apparatus for the instantaneous preparation of congealed foodstuffs such as ice creams or the like, comprising a spiral rotor, diverging channels in said rotor communicating with the tubular axis thereof and through which the material to be congealed is adapted to be introduced, a fan on said rotor adapted to supply auxiliary air into the apparatus, a valve for adjusting the quantity of such auxiliary air, axial perforations in said valve permitting the introduction, simultaneously with air, of perfumed vapors or essences stored in a cartridge in an axial perforation of said valve, a fixed refrigerated wall outside said rotor upon which the jets of aerated material are adapted to be projected and refrigerated, and a spiral projection on said rotor at the outlet of each of said divergent channels adapted to scrape off and remove downwardly the congealed material coming from the corresponding channel.

4. Apparatus for the preparation of congealed foodstuffs comprising a chamber having a continuous wall, means for passing a refrigerant over the outer surface of said wall, rotary means to project liquid material to be congealed against the inner surface of said wall; rotary means to scrape frozen material from and along said wall and force such material out of said chamber, both of said rotary means having a common axis of rotation; a plurality of compartments for holding the liquid material to be congealed; conduit means communicating with said material projecting means and aligned with said axis of rotation, and means operable so as selectively to connect any one of said compartments with said conduit means, said selectively operable means being constructed and arranged to prevent the selection of more than one compartment at a time.

ALBERTO FRANCESCO GENOVA.

REFERENCES CITED

The following references are of record in the file of this patent:

UNITED STATES PATENTS

| Number | Name | Date |
|---|---|---|
| 2,064,597 | Engelman | Dec. 15, 1936 |
| 2,094,354 | Genova | Sept. 28, 1937 |
| 2,083,072 | Lindsey | June 8, 1937 |
| 1,791,773 | Vogt | Feb. 10, 1931 |
| 1,455,156 | Willson | May 15, 1923 |